Sept. 25, 1962 J. G. SPRACKLEN 3,055,976

TELEVISION RECEIVER

Original Filed Jan. 12, 1953

2 Sheets-Sheet 1

JOHN G. SPRACKLEN
*INVENTOR.*

BY Francis W. Crotty

HIS ATTORNEY.

JOHN G. SPRACKLEN
*INVENTOR.*
BY Francis W. Crotty
HIS ATTORNEY.

United States Patent Office 3,055,976

Patented Sept. 25, 1962

3,055,976

TELEVISION RECEIVER

John G. Spracklen, Chicago, Ill., assignor to Zenith Radio Corporation, a corporation of Delaware Continuation of application Ser. No. 330,620, Jan. 12, 1953. This application Aug. 24, 1960, Ser. No. 52,321
6 Claims. (Cl. 178—7.5)

Figure 1:
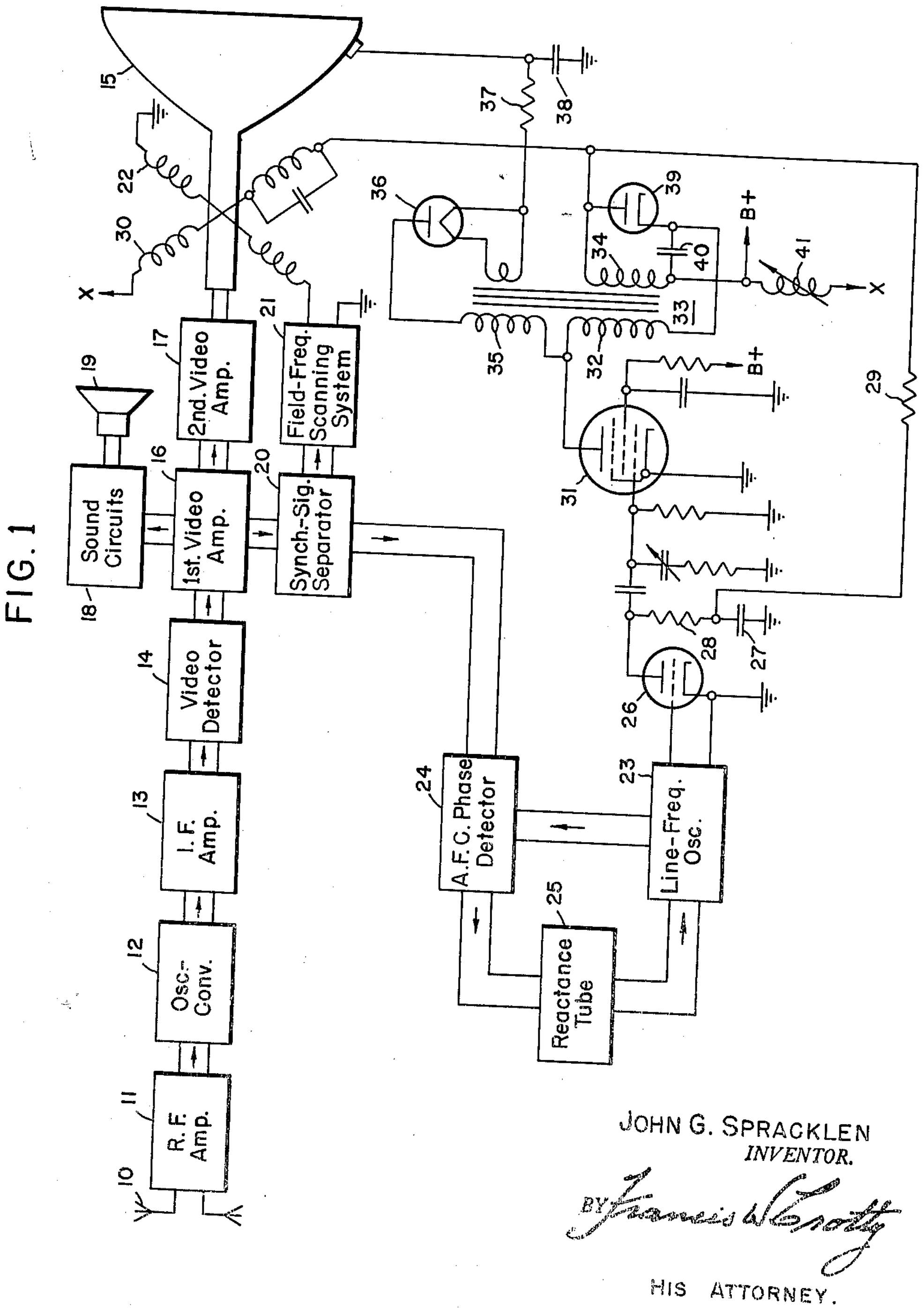

This invention relates to television receivers and more particularly to improved scanning systems for use in such receivers. This application is a continuation of copending application Serial No. 330,620, filed January 12, 1953.

In conventional television transmission and reception, the scanned image at the transmitter is represented by a composite video signal comprising video-signal components indicative of the picture content and periodic synchronizing-signal components representative of the timing of the line-frequency and field-frequency scansion. Transmission is effected by modulating a very-high-frequency or ultra-high-frequency carrier wave with the composite video signal, and this modulated carrier wave is amplified and detected at the receiver to reproduce the original composite video signal. The video-signal components, after amplification, are applied to the control grid circuit of a cathode-ray tube or otherwise employed to control the shade values of an image-reproducing device, while the synchronizing-signal components are separated from the detected composite video signal and employed to control the scanning circuits associated with the image-reproducing device. In the field-frequency scanning system, the field-frequency synchronizing pulses are generally directly applied to trigger a blocking oscillator or other type of relaxation oscillator, and the sawtooth current from the output of the relaxation oscillator is applied to the field-frequency deflection coils to effect the vertical scansion of the image reproducer. In the line-frequency scanning systems, it is conventional practice to apply the separated line-frequency synchronizing pulses to a phase detector for comparison with a locally generated signal of the line-scanning frequency to produce a unidirectional control signal which is utilized to provide automatic frequency control of the line-frequency oscillator; output pulses from the line-frequency oscillator are employed to trigger a discharge tube associated with a wave-shaping network comprising a storage condenser connected to a charging circuit including a source of positive unidirectional operating potential, and the resulting sawtooth current is amplified and applied to the line-frequency deflection coils to effect horizontal scansion of the image reproducer. It is also possible, with some sacrifice in synchronization stability, to trigger the discharge tube directly with the separated horizontal synchronizing pulses.

In a line-frequency scanning system of the type employing a discharge tube, the reliability of the scanning synchronization is dependent upon the generation of adequate driving power for the sweep output stage by the periodic discharge of the storage condenser in the wave-shaping network. In many receivers, particularly those designed for optimum performance without particular emphasis on cost, the driving power furnished by the discharge tube to the sweep output stage is sufficiently great to insure complete periodic discharge of the storage condenser. However, in other receivers, the driving power furnished by the discharge tube is marginal, and occasional loss of synchronization or sweep distortion may be encountered. This difficulty is particularly noticeable in receivers constructed with an emphasis on economy and comprising a minimum number of electron tubes. Such loss of synchronization and sweep distortion, however sporadic or infrequent, detract from the quality of the reproduced image and are therefore highly undesirable.

It is an important object of the present invention to provide a new and improved scanning system for a television receiver which overcomes one or more of the disadvantages of prior art scanning systems.

It is a more specific object of the invention to provide a television receiver scanning system in which the driving power furnished by the discharge tube to the sweep output stage is augmented, thus stabilizing the receiver against loss of synchronization or sweep distortion in the reproduced image.

In accordance with the present invention, flyback or retrace pulses developed in one of the windings of the sweep output transformer are integrated and applied to the storage condenser in the wave-shaping network to increase the amplitude of the developed scanning signal and provide improved stability in the operation of the scanning system.

Figure 2:
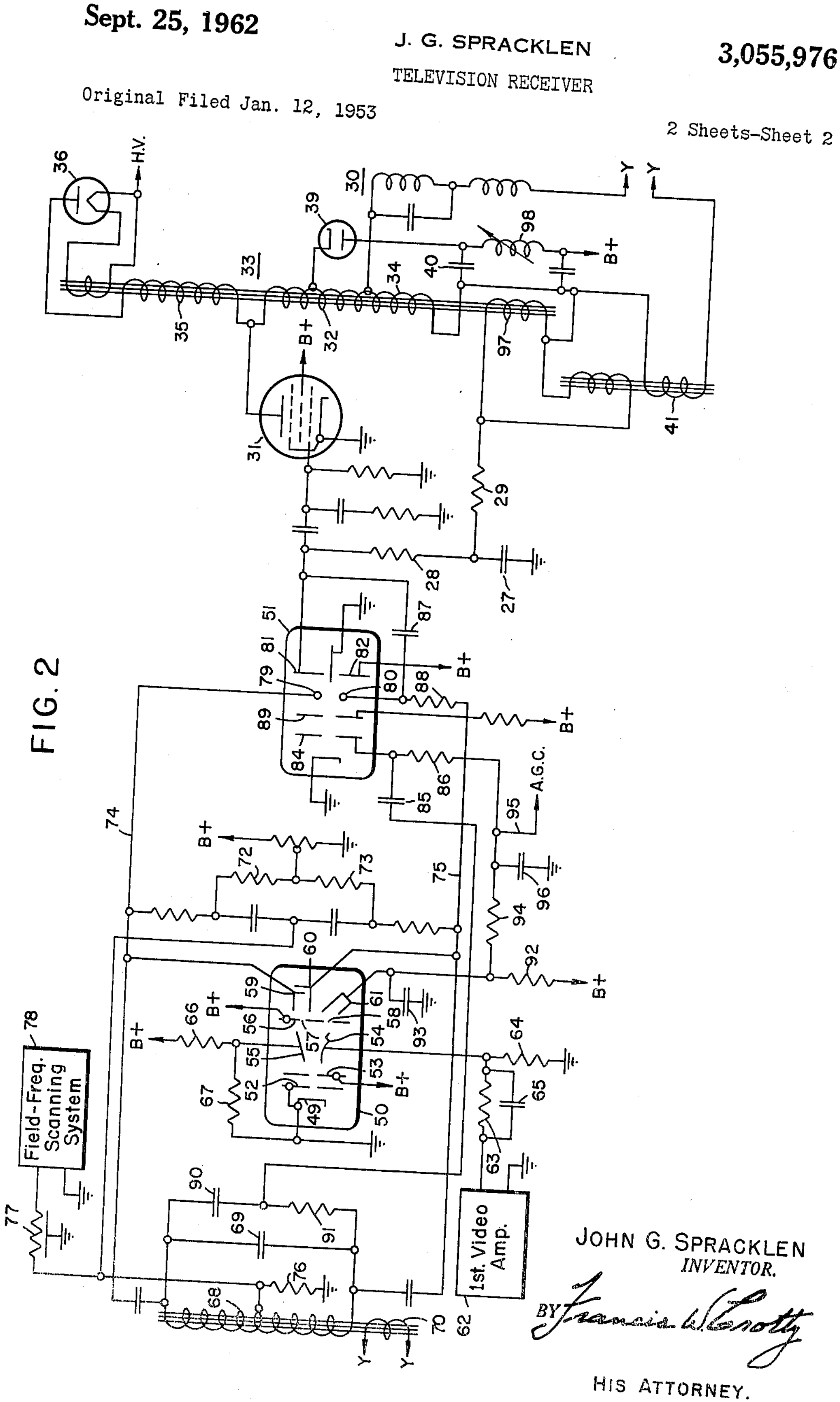

The features of the present invention which are believed to be novel are set forth with particularity in the appended claims. The inventoin, together with further objects and advantages thereof, may best be understood, however, by reference to the following description taken in connection with the accompanying drawings, in the several figures of which like reference numerals indicate like elements, and in which:

FIGURE 1 is a schematic diagram of a television receiver embodying the present invention, and FIGURE 2 is a schematic circuit diagram of a portion of a television receiver of a type in which the present invention is particularly useful.

In FIGURE 1, incoming composite television signals are intercepted by an antenna 10 and amplified by a radio-frequency amplifier 11 consisting of one or more stages. The amplified radio-frequency signals are converted to an intermediate frequency by means of an oscillator-converter 12, and the intermediate-frequency output signals from oscillator-converter 12 are amplified by means of an intermediate-frequency amplifier 13 also consisting of one or more stages. The amplified intermediate-frequency signals are applied to a video detector 14, and the composite video signals developed by video detector 14 are applied to the input circuit of a cathode-ray tube 15 or other image-reproducing device after amplification in first and second video amplifiers 16 and 17. Intercarrier sound signals from first video amplifier 16 are limited, demodulated, and amplified by means of suitable sound circuits 18, and the resulting audio-frequency signals, representing the sound intelligence accompanying the telecast, are applied to a loudspeaker 19 or other sound-reproducing device.

Composite video signals from first video amplifier 16 are also applied to a synchronizing-signal separator 20 which separates the line-frequency and field-frequency synchronizing pulses from the composite video signal and discards the video-signal components. Field-frequency synchronizing pulses from separator 20 are applied to a field-frequency scanning system 21 which in turn supplies suitable scanning currents to the field-frequency deflection coils 22 associated with image-reproducing device 15.

Line-frequency synchronizing pulses from separator 20 are compared in phase with a locally generated line-frequency signal from a local oscillator 23 by means of an automatic-frequency-control phase-detector 24, and the unidirectional control signal developed by phase detector 24 is employed to control the frequency of line-frequency oscillator 23 through the medium of a reactance tube 25. In this manner, periodic trigger pulses recurring at a frequency corresponding to the average frequency of the line-synchronizing pulses from separator 20 are produced in the output of line-frequency oscillator 23, and these trigger pulses are substantially insensitive to atmospheric or other noise conditions which may cause sporadic loss of the synchronizing components of the received composite video signals during intervals up to several line-scanning periods in duration.

The line-frequency trigger pulses from oscillator 23 are applied to the input circuit of a normally nonconductive discharge tube 26 in such polarity as to render discharge tube 26 conductive and dissipate the charge accumulated across a storage condenser 27 connected in a charging circuit comprising a resistor 29, the line-frequency deflection coils 30 associated with image-reproducing device 15, and a suitable source of positive unidirectional operating potential conventionally designated B+. A peaking resistor 28 is connected in series with storage condenser 27 and the anode current path of discharge tube 26 to constitute a wave-shaping network for developing a peaked sawtooth voltage wave which is applied to a scanning amplifier comprising an electron-discharge device 31, in the output circuit of which is connected the primary winding 32 of a sweep output transformer 33. The output secondary winding 34 of sweep transformer 33 is coupled to line-frequency deflection coils 30 to control the horizontal scansion. Final anode voltage for image-reproducing device 15 is developed by means of a conventional circuit comprising a high-voltage secondary winding 35 of sweep transformer 33, a rectifier tube 36, and a smoothing filter comprising a series resistor 37 and a shunt condenser 38.

For the purpose of providing increased power output, positive unidirectional operating potential for the anode of sweep amplifier tube 31 is supplied through output secondary winding 34 of sweep transformer 33 and the customary damper diode 39 connected in parallel with line-frequency deflection coils 30 for the purpose of suppressing undesirable ringing currents, and a storage condenser 40 is connected between the cathode of damper diode 39 and the lower terminal of output secondary winding 34. Additional features, such as a series-connected size-control inductor 41, may also be included if desired.

Except for the details of the discharge tube circuit, the receiver of FIGURE 1 may be completely conventional in construction and operation. Numerous alternative constructions are known for the various stages represented in block form, and the automatic frequency control system may be entirely omitted if desired, with the discharge tube 26 serving as a blocking oscillator directly triggered by the line-frequency synchronizing pulses from the output of separator 20.

In accordance with the present invention, line-frequency flyback or retrace pulses of negative polarity are integrated, preferably by means of charging resistor 29 and storage condenser 27 in the wave-shaping network coupled to discharge tube 26, and the resulting sawtooth voltage is superimposed on the scanning voltage developed by the plate current of discharge tube 26 across wave-shaping network 27, 28 to augment the driving power furnished by the discharge tube to the sweep output stage.

Since discharge tube 26 is normally non-conductive, a positive charge is built up across storage condenser 27 through the charging circuit comprising resistor 29 and unidirectional operating potential source B+. When a positive-polarity trigger pulse from line-frequency oscillator 23 is impressed on the control grid of discharge tube 26, that tube draws plate current for the duration of the trigger pulse, and discharge of storage condenser 27 is initiated through a path comprising resistor 28 and the anode-cathode space current path of discharge tube 26. In the absence of the flyback pulse feedback circuit of the present invention, the completeness of the discharge is determined entirely by the anode current capabilities of discharge tube 26.

In accordance with the present invention, however, negative-polarity retrace or flyback pulses from output secondary winding 34 of sweep transformer 33 are integrated by means of resistor 29 and storage condenser 27 and superimposed on the peaked sawtooth voltage wave developed across the wave-shaping network comprising resistor 28 and condenser 27. In other words, an auxiliary discharge path for storage condenser 27 is established through resistor 29 and deflection coils 30. In this manner, the amplitude of the scanning signal applied to sweep output tube 31 is effectively increased, with an appreciable portion of the driving power required for the sweep output stage being derived from the yoke circuit. Consequently, the discharge tube need only furnish sufficient driving power to initiate the sweep retrace at the proper instant determined by the synchronizing circuits of the receiver; once the flyback has been initiated, the integrated flyback pulses fed back to the sweep output stage insure complete discharge of the storage condenser and preclude scanning instability or sweep distortion.

Stated in another way, the invention provides a system for insuring adequate driving power for the sweep output stage in a television receiver comprising a discharge tube which of itself may be incapable of furnishing sufficient current during the retrace interval to completely discharge the storage condenser. When the trigger pulse is applied to discharge tube 26, it is translated in sufficient magnitude to peaking resistor 28 to drive sweep-amplifier tube 31 beyond cutoff and initiate the retrace flyback. This gives rise to a negative-polarity flyback pulse across horizontal deflection coil 30, and this negative-polarity flyback pulse is integrated by charging resistor 29 and storage condenser 27 to supply additional driving power for the sweep-amplifier tube. Since the power required to drive the sweep output stage is somwhat greater than that required to initiate the flyback, the flyback pulse developed across the horizontal deflection coil is integrated to supply additional driving power for the sweep-amplifier tube.

The reduction in the amount of driving power which must be furnished by the discharge tube renders the invention of advantage in effecting receiver economy by permitting the use of a discharge tube having a materially lower plate current capacity than those conventionally employed in television receivers. Of even greater importance, however, the system of the present invention provides improved stability of operation of any system employing a discharge tube of limited plate current capacity, as for example a television receiver employing the synchronizing and automatic gain control system illustrated in the schematic diagram of FIGURE 2.

The system of FIGURE 2 employs a pair of beam-deflection tubes 50 and 51 to perform all of the functions normally accomplished by five or more individual electrode systems in a conventional television receiver. Specifically, tubes 50 and 51 and the associated circuitry are employed to provide noise-immune synchronizing-signal separation and automatic-gain-control generation, automatic-frequency-control phase-detection, generation of line-frequency oscillations, automatic-frequency-control of the line-frequency oscillator, and periodic discharge of the storage condenser in the wave-shaping network coupled to the input of the sweep amplifier stage.

The constructional details of beam-deflection tubes 50 and 51 and of the illustrated circuit arrangement are described and claimed in one or more of the following copending patents:

| Applicant | Patent No. | Issue Date | Title |
|---|---|---|---|
| Robert Adler | 2,717,972 | 9-13-55 | Electron-Discharge Device. |
| John G. Spracklen | 2,768,319 | 10-23-56 | Television Receiver. |
| Do | 2,684,403 | 7-20-54 | Do. |
| Robert Adler | 2,740,002 | 3-27-56 | Synchronizing-Control Apparatus. |
| Do | 2,741,721 | 4-10-56 | Electron-Discharge Device. |
| Do | 2,684,404 | 7-20-54 | Frequency Controllable Oscillating Systems. |
| Do | 2,781,468 | 2-12-57 | Television Receiver. |
| Do | 2,691,117 | 10- 5-54 | Electron-Discharge Device. |
| Do | 2,882,334 | 4-14-59 | Television Receiver. |
| Do | 2,814,801 | 11-26-57 | Do. |
| John G. Spracklen | 2,875,331 | 2-24-59 | Do. |
| Do | 2,811,581 | 10-29-57 | Television Receiver Scanning System. |
| Do | 2,721,895 | 10-25-55 | Television Receiver. |

However, a brief description of the system is desirable to provide an appreciation of the principles and advantages of the present invention as applied to a system of this type.

The heart of the synchronizing-control and automatic-gain-control system of FIGURE 2 is special-purpose beam-deflection tube 50. A sheet-like electron beam is generated by means of an electron gun comprising a cathode 49, a focusing electrode 52, and an accelerating electrode 53 and is projected between a pair of deflectors 54 and 55 toward a target electrode 56 provided with a pair of apertures 57 and 58 which in practice are arranged in overlapping alignment in the plane of the electron beam although, for purposes of convenience in the schematic representation of FIGURE 2, they are illustrated in another manner. Aperture 57, which may be termed the sync-clipping slot, is followed by a pair of electrically symmetrical collector electrodes 59 and 60 which serve as phase-detector anodes, while aperture 58, which may be termed the AGC slot, is followed by a single collector or AGC plate 61. Composite video signals from first video amplifier 62, with the synchronizing-pulse components positively oriented relative to the video-signal components, are applied to active deflector 54 through a resistive voltage divider comprising resistors 63 and 64; resistor 63 may be bypassed by means of a condenser 65 to translate the alternating component unattenuated. The passive or companion deflector 55 is maintained at a suitable positive bias potential by means of a voltage divider comprising resistors 66 and 67 connected between B+ and ground. Thus, the electron beam projected between deflectors 54 and 55 is laterally deflected in accordance with the composite video signals, and the bias potentials of the deflection-control system are adjusted to permit beam current to pass through the sync-clipping and AGC slots 57 and 58 only during synchronizing-pulse intervals.

At the same time, a balanced comparison signal is applied between phase-detector anodes 59 and 60 by means of a tuned circuit 68, 69 which is energized from the line-frequency deflection circuit by means of a feedback winding 70, as indicated by the terminal designations Y—Y. Thus, the beam current projected through sync-clipping slot 57 during line-frequency synchronizing-pulse intervals is distributed between phase-detector anodes 59 and 60 in accordance with the instantaneous phase relation between the line-synchronizing pulses and the line-frequency scanning signal impressed on the deflection coils 30 associated with the image-reproducing device (not shown). A suitable balanced load circuit 72, 73 is coupled between phase-detector anodes 59 and 60 by means of suitable anticipatory or anti-hunt networks, with the result that a balanced unidirectional control potential indicative of the instantaneous phase relation between the incoming synchronizing-pulse components and the line-frequency scansion is produced between conductors 74 and 75.

At the same time, both phase-detector anodes 59 and 60 are returned to ground through a common resistor 76 connected to a center tap on coil 68, to provide field-frequency synchronizing pulses which are integrated by means of an integrator 77 and applied to the field-frequency scanning system 78 associated with the image-reproducing device (not shown).

The same comparison signals applied between phase-detector anodes 59 and 60 of beam-deflection tube 50 are also applied between the deflectors 79 and 80 of another beam-deflection tube 51, which may be of generally conventional construction comprising a pair of balanced output anodes 81 and 82. Thus, the electron beam of deflection tube 51 is subjected to a periodic lateral deflection at the line-scanning rate. However, the duty cycle of the anode system of deflection tube 51 is modified in accordance with the unidirectional control potential between conductors 74 and 75 to provide an automatic-frequency-control action. The output anode 81 of beam-deflection tube 51 is coupled to wave-shaping network 27, 28, with beam-deflection tube 51 also serving as the discharge tube of the line-frequency scanning system. The sweep amplifier stage, including electron-discharge device 31, is generally similar to that shown in FIGURE 1 except that sweep output transformer 33 is of the single-winding or autotransformer variety. The development of spurious output pulses at anode 81 is prevented by applying a positive-polarity gating signal from a phase-shifting network comprising a condenser 90 and a resistor 91 connected in series across coil 68 to the focusing electrode 84 of beam-deflection tube 51, by means of a coupling condenser 85 and resistor 86. The discharge pulse is sharpened by means of regenerative feedback from anode 81 to deflector 80 through a condenser 87 and a resistor 88.

AGC plate 61 of special-purpose beam-deflection tube 50 is connected to B+ through a resistor 92 and is coupled to ground through a condenser 93. Due to the finite boundaries of aperture 58, and the initial bias of the deflection-control system, beam current is directed to AGC plate 61 only during synchronizing-pulse intervals, and the amount of beam current directed to AGC plate 61 during such intervals is indicative of the instantaneous signal amplitude. This current is converted to a unidirectional AGC potential by means of condenser 93. A negative-polarity reference potential is developed by the rectification by focusing electrode 84 of beam-deflection tube 51 of the gating voltage applied from phase-shifting network 90, 91. Resistors 86 and 92 in conjunction with an intermediate resistor 94 constitute a voltage divider to establish the resulting AGC potential at the desired level for application through lead 95, which is by-passed to ground through a condenser 96, to one or more of the receiving circuits preceding the video detector (not shown).

All the features of the system of FIGURE 2 thus far described have been explained in detail in one or more of the above-identified copending applications. In accordance with the present invention, integrated negative-polarity retrace or flyback pulses are employed to augment the scanning signal developed across the wave-shaping network coupled to the anode of the discharge tube. In the circuit of FIGURE 2, the desired negative-polarity pulses are not available from any portion of the primary or output secondary windings of the sweep transformer 33. Consequently, an auxiliary phase-inverting winding 97 is coupled to the sweep transformer output winding to develop the desired negative-polarity flyback pulses. Auxiliary winding 97 is coupled to the ungrounded terminal of storage condenser 27, preferably through series charging resistor 29. Size-control inductor 41 may again be coupled in series with line-frequency deflection coils 30, with a compensating winding coupled in parallel with auxiliary winding 97 of sweep transformer 33, and a variable linearity-control inductor may be connected in series between damper diode 39 and B+.

The operation of the scanning-signal generator is similar to that of the embodiment of FIGURE 1. The initiation of space current flow to anode 81 of beam-deflection tube 51 suddenly lowers the voltage across condenser 27 and resistor 28 in series. (Since it takes a while to discharge the condenser, the drop at anode 81 can be quite rapid while the condenser is only beginning to discharge.) The sudden drop of the grid potential of sweep-amplifier tube 31 cuts the plate current off and starts the flyback. Thus, a negative pulse is produced across winding 97. Through resistor 29, this draws a pulse current out of condenser 27.

Thus, the pulse current drawn by the discharge tube through peaking resistor 28 is joined by a vary similar and almost simultaneous pulse current through charging resistor 29. The total charge withdrawn from storage condenser 27 is the sum of the two pulses. The voltage across condenser 27 represents the time integral of the total current. In other words, the integrated flyback pulses, in the form of a sawtooth voltage wave, are coupled through peaking resistor 28 to the input grid of sweep amplifier tube 31 to augment the scanning signal developed across wave-shaping network 27, 28 by the periodic discharge of storage condenser 27 through the anode current path of beam deflection tube 51. Consequently, beam-deflection tube 51, in its function as a discharge tube, need draw only sufficient current to control the timing of the initiation of the discharge, and the operation of the scanning system is materially stabilized.

Direct-drive sweep systems are known in which the deflection yoke is of sufficiently high impedance to be directly driven from the plate circuit of the sweep amplifier tube, without the use of a sweep transformer. In such systems, it is conventional to employ an auxiliary transformer, driven from the plate circuit of the sweep amplifier tube, to develop positive-polarity flyback pulses which are rectified to produce a suitable high voltage for energization of the final anode of the picture tube. The present invention may also be employed to advantage in a system of this type, by deriving the negative-polarity flyback pulses from an auxiliary winding of the high-voltage transformer. As in the other embodiments, these negative-polarity flyback pulses are integrated and impressed on the input circuit of the sweep amplifier tube to augment the driving power furnished by the periodic current pulses through the discharge tube.

Thus, the present invention provides a simple circuit arrangement which may be employed to advantage in any television receiver scanning system employing a discharge tube. The system possesses the advantages of simplicity and economy and may readily be adapted to any type of sweep output stage. The invention is of particular advantage in reducing the amount of power required to drive the sweep output stage of a scanning system in which the discharge tube element is characterized by a relatively small current capacity, as for example a system of the type shown and described in connection with FIGURE 2.

While particular embodiments of the present invention have been shown and described, it is apparent that various changes and modifications may be made, and it is therefore contemplated in the appended claims to cover all such changes and modifications as fall within the true spirit and scope of the invention.

I claim:

1. In a television receiver for utilizing composite video signals including video-signal components and periodic synchronizing-signal components recurring at a predetermined scanning frequency, of the type including an image-reproducing device having an associated magnetic-deflection yoke for controlling its scansion in accordance with an applied scanning signal: means responsive to said synchronizing-signal components for developing periodic trigger pulses recurring at said scanning frequency; a storage condenser; a charging circuit for said storage condenser; a normally non-conductive discharge tube having its space current path coupled to said storage condenser; means for applying said trigger pulses to said discharge tube to key it periodically into space current conductivity thereby to develop a periodic scanning signal having a component of sawtooth waveshape across said storage condenser; an electron-discharge amplifier having an input circuit coupled to said storage condenser and an output circuit coupled to said deflection yoke; a transformer comprising a plurality of intercoupled windings; means coupling one of said windings to said output circuit; and integrating means, having a time constant long with respect to the period of said scanning signal, coupled to another of said windings for developing a sawtooth voltage of substantially the same waveshape as said scanning signal component by integration of flyback pulses appearing across said other winding and for feeding back said sawtooth voltage to said input circuit to augment said scanning signal and effectively reduce the driving power required by said electron-discharge amplifier from said discharge tube.

2. In a television receiver for utilizing composite video signals including video-signal components and periodic synchronizing-signal components recurring at a predetermined scanning frequency, of the type including an image-reproducing device having an associated magnetic-deflection yoke for controlling its scansion in accordance with an applied scanning signal: means responsive to said synchronizing-signal components for developing periodic trigger pulses recurring at said scanning frequency; a storage condenser; a charging circuit for said storage condenser; a normally non-conductive discharge tube having its space current path coupled to said storage condenser; means for applying said trigger pulses to said discharge tube to key it periodically into space current conductivity thereby to develop a periodic scanning signal having a component of sawtooth waveshape across said storage condenser; a sweep transformer comprising a plurality of intercoupled windings including input and output windings; means including an electron-discharge amplifier for applying said scanning signal to said input winding; means coupling said output winding to said deflection yoke; and integrating means, having a time constant long with respect to the period of said scanning signal, coupled to one of said windings for developing a sawtooth voltage of substantially the same waveshape as said scanning signal component by integration of flyback pulses appearing across said one winding and for feeding back said sawtooth voltage to the input of said electron-discharge amplifier to augment said scanning signal and effectively reduce the driving power required by said electron-discharge amplifier from said discharge tube.

3. In a television receiver for utilizing composite video signals including video-signal components and periodic synchronizing-signal components recurring at a predetermined scanning frequency, of the type including an image-reproducing device and a magnetic-deflection yoke associated with said device for controlling its scansion in accordance with an applied scanning signal: means responsive to said synchronizing-signal components for developing periodic positive-polarity trigger pulses recurring at said scanning frequency; a storage condenser; a charging circuit for said storage condenser including a resistor coupled in series with said storage condenser; a normally non-conductive discharge tube having its space current path coupled to said storage condenser; means for applying said trigger pulses to said discharge tube to key it periodically into space current conductivity thereby to develop a periodic scanning signal having a component of sawtooth waveshape across said storage condenser; a sweep transformer comprising a plurality of intercoupled windings including input and output windings; means including an electron-discharge amplifier for applying said scanning signal to said input winding; means coupling said output winding to said deflection yoke; and integrating means, having a time constant long with respect to the period of said scanning signal, coupled to one of said windings for developing a sawtooth voltage of substantially the same waveshape as said scanning signal component by integration of negative-polarity flyback pulses appearing across said one winding and for feeding back said sawtooth voltage to the input of said electron-discharge amplifier to augment said scanning signal and effectively reduce the driving power required by said electron-discharge amplifier from said discharge tube.

4. In a television receiver for utilizing composite video signals including video-signal components and periodic synchronizing-signal components recurring at a predetermined scanning frequency, of the type including an image-reproducing device and a magnetic-deflection yoke associated with said device for controlling its scansion in accordance with an applied scanning signal: means responsive to said synchronizing-signal components for developing periodic trigger pulses recurring at said scanning frequency; a storage condenser; a charging circuit for said storage condenser; a normally non-conductive discharge tube having its space current path coupled to said storage condenser; means for applying said trigger pulses to said discharge tube to key it periodically into space current conductivity thereby to develop a periodic scanning signal having a component of sawtooth waveshape across said storage condenser; a sweep transformer comprising a plurality of intercoupled windings including input and output windings; means including an electron-discharge amplifier for applying said scanning signal to said input winding; means coupling said output winding to said deflection yoke; and integrating means, including said storage condenser and having a time constant long with respect to the period of said scanning signal, coupled to one of said windings for developing a sawtooth voltage of substantially the same waveshape as said scanning signal component by integration of flyback pulses appearing across said one winding and for feeding back said sawtooth voltage to the input of said electron-discharge amplifier to augment said scanning signal and effectively reduce the driving power required by said electron-discharge amplifier from said discharge tube.

5. In a television receiver for utilizing composite video signals including video-signal components and periodic synchronizing-signal components recurring at a predetermined scanning frequency, of the type including an image-reproducing device and a magnetic-deflection yoke associated with said device for controlling its scansion in accordance with an applied scanning signal: means responsive to said synchronizing-signal components for developing periodic trigger pulses recurring at said scanning frequency; a wave-shaping network including a storage condenser and a peaking resistor; a charging circuit for said storage condenser including a charging resistor coupled in series with said storage condenser; a normally non-conductive discharge tube having its space current path coupled to said wave-shaping network; means for applying said trigger pulses to said discharge tube to key it periodically into space current conductivity thereby to develop a periodic scanning signal having a component of sawtooth waveshape across said wave-shaping network; a sweep transformer comprising a plurality of intercoupled windings including input and output windings; means including an electron-discharge amplifier for applying said scanning signal to said input winding; means coupling said output winding to said deflection yoke; and integrating means, including said storage condenser and said charging resistor and having a time constant long with respect to the period of said scanning signal, coupled to one of said windings for developing a sawtooth voltage of substantially the same waveshape as said scanning signal component by integration of flyback pulses appearing across said one winding and for feeding back said sawtooth voltage to the input of said electron-discharge amplifier to augment said scanning signal and effectively reduce the driving power required by said electron-discharge amplifier from said discharge tube.

6. In a television receiver for utilizing composite video signals including video-signal components and periodic synchronizing-signal components recurring at a predetermined scanning frequency, of the type including an image-reproducing device and a magnetic-deflection yoke associated with said device for controlling its scansion in accordance with an applied scanning signal: means responsive to said synchronizing-signal components for developing periodic trigger pulses recurring at said scanning frequency; a storage condenser; a charging circuit for said storage condenser; a normally non-conductive discharge tube having its space current path coupled to said storage condenser; means for applying said trigger pulses to said discharge tube to key it periodically into space current conductivity thereby to develop a periodic scanning signal having a component of sawtooth waveshape across said storage condenser; a sweep autotransformer having input and output windings and an auxiliary polarity-inverting winding coupled to said output winding; means including an electron-discharge amplifier for applying said scanning signal to said input winding; means coupling said output winding to said deflection yoke; and integrating means, having a time constant long with respect to the period of said scanning signal, coupled to said auxiliary winding for developing a sawtooth voltage of substantially the same waveshape as said scanning signal component by integration of flyback pulses appearing across said one winding and for feeding back said sawtooth voltage to the input of said electron-discharge amplifier to augment said scanning signal and effectively reduce the driving power required by said electron discharge amplifier from said discharge tube.

References Cited in the file of this patent

Rider's Television, Manual, Vol. 2, Copyright 1949, DuMont TV, pages 2–3, 4 (DuMont model RA–101b).